No. 652,424. Patented June 26, 1900.
J. CALLEGARI.
LIFTING JACK.
(Application filed Apr. 9, 1900.)
(No Model.) 2 Sheets—Sheet 2.
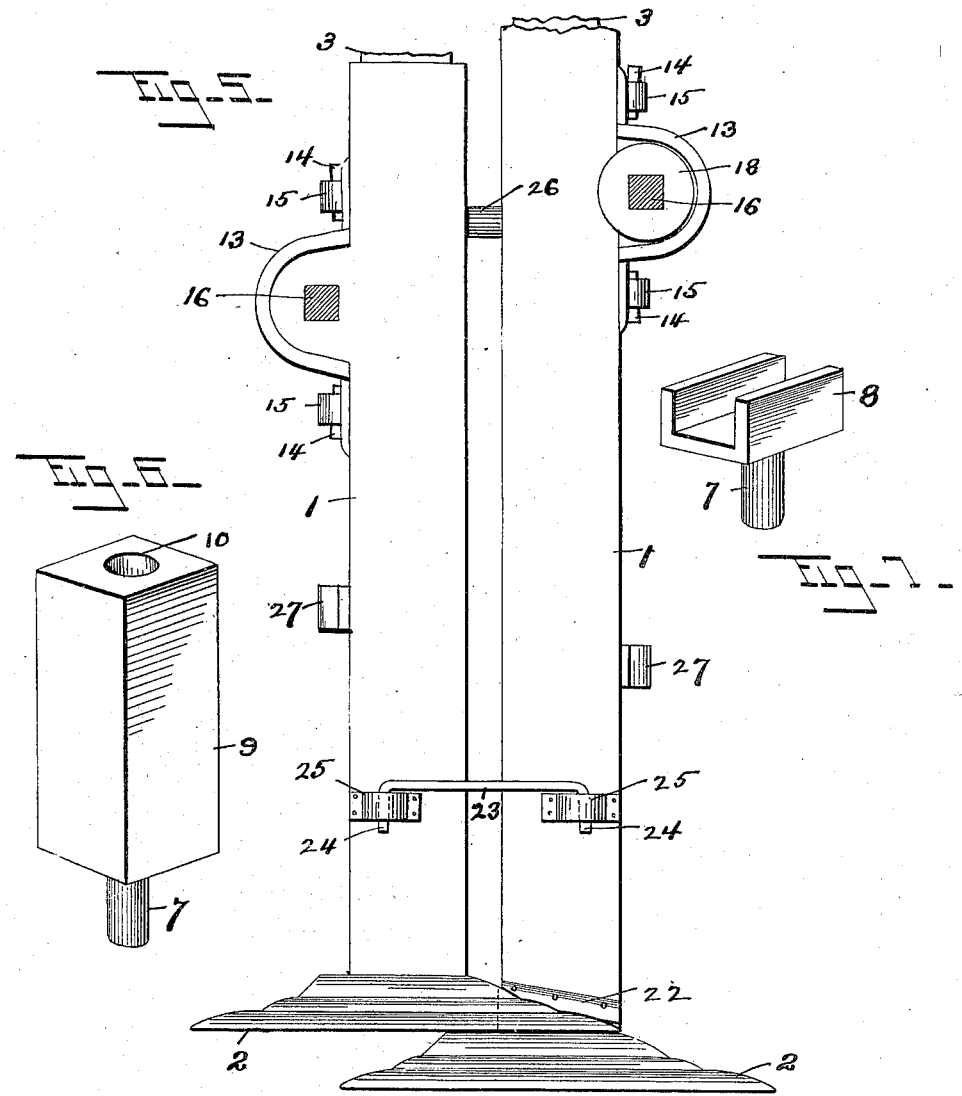
Witnesses.
J. P. Dejon
Florence Monk.
Inventor.
Joseph Callegari
by George E Hall
Attorney.

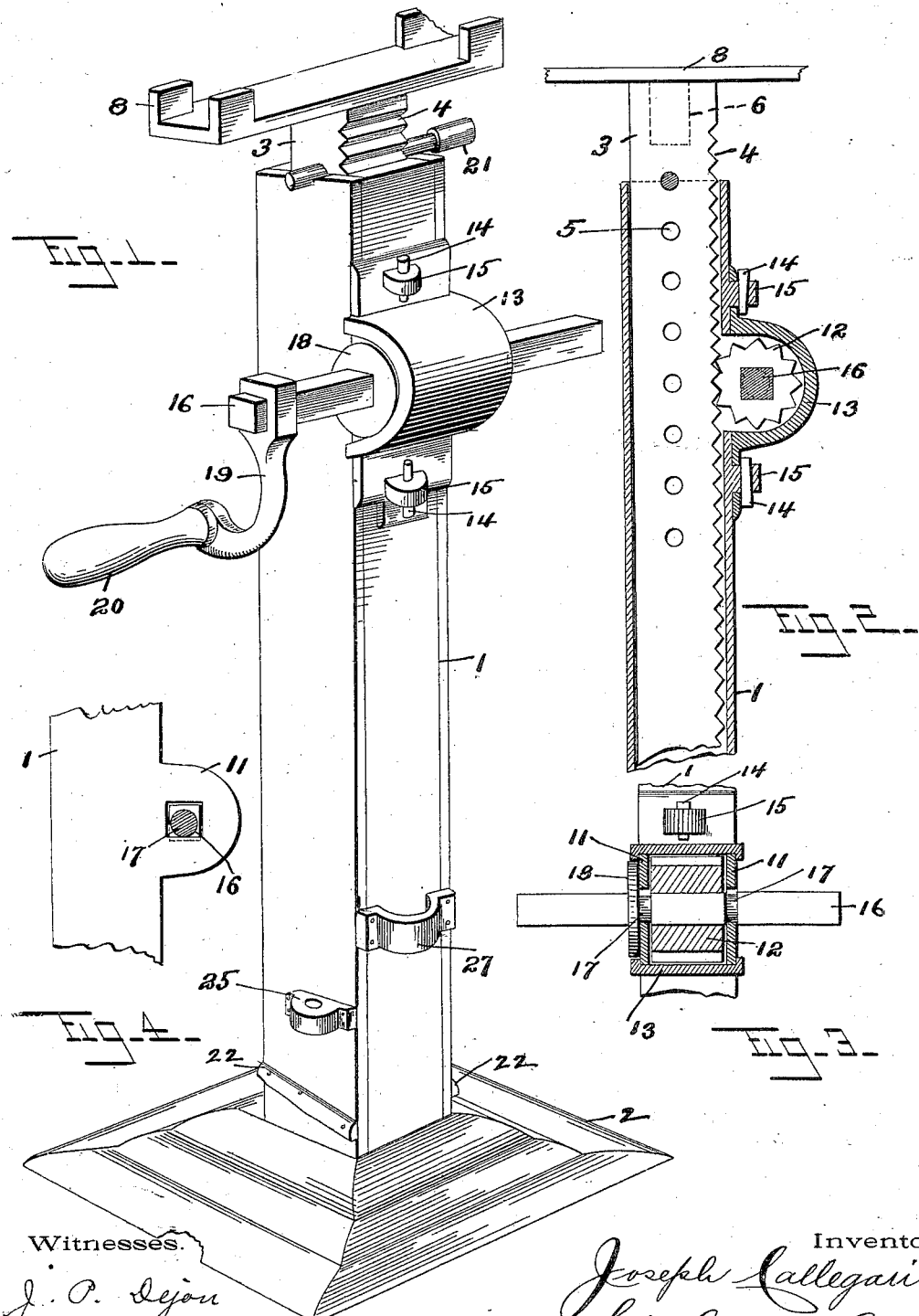

UNITED STATES PATENT OFFICE.

JOSEPH CALLEGARI, OF NEW HAVEN, CONNECTICUT.

LIFTING-JACK.

SPECIFICATION forming part of Letters Patent No. 652,424, dated June 26, 1900.

Application filed April 9, 1900. Serial No. 12,065. (No model.)

*To all whom it may concern:*

Be it known that I, JOSEPH CALLEGARI, a subject of Humbert I, King of Italy, residing at New Haven, in the county of New Haven and State of Connecticut, have invented certain new and useful Improvements in Lifting-Jacks, of which the following is a specification, reference being had therein to the accompanying drawings.

My invention relates to improvements in lifting-jacks, the object of which is to construct a simple device having few parts which can be economically constructed and readily assembled.

The device hereinafter shown and described is adapted to be used in pairs, and to provide for the securing of the jacks together when not in use, so as to require the smallest possible space, is a further object of my invention.

To these and other ends my invention consists in a lifting-jack having certain details of construction and combination of parts, as will be hereinafter described, and more particularly pointed out in the claims.

Referring to the drawings, in which like numerals designate like parts in the several views, Figure 1 is a perspective view of one of the jacks complete. Fig. 2 is a fragmentary vertical section thereof. Fig. 3 is a sectional view of the pinion-ears, pinion, guard-cover, and its adjacent mechanism. Fig. 4 is a fragmentary side elevation of that portion of the frame adjacent to the pinion-shaft ears with the pinion-shaft shown in section. Fig. 5 is an elevation of the two jacks when fastened together. Fig. 6 is a perspective view of the extension-bar. Fig. 7 is a perspective view of one form of headpiece.

In the drawings the numeral 1 designates the upright frame, which is preferably hollow and supported upon a foot or base portion 2. Movable vertically within the said frame is a lifting-bar 3, having a series of teeth 4, forming a rack in one edge, and a plurality of pin-holes 5 extending through said bar.

The upper end of the lifting-bar 3 is provided with a socket-hole 6, within which is fitted the shank 7 of either the headpiece 8 or the extension-bar 9, which extension-bar is also provided with a socket-hole 10 in its upper end. The design of the headpiece 8 can be varied indefinitely and adapted for any special class of work in connection with which the said lifting-jacks are to be used. Two different styles of headpieces are shown in Figs. 1 and 7. By attaching the extension-bar 9 (which may be of varying lengths) to the lifting-bar 3 it is apparent that a much longer lifting-bar is obtained, and the head 8 occupies a more elevated position.

Projecting from the frame 1 are the ears 11 11, having a square hole therethrough, and mounted between the said ears is a pinion 12, the teeth of which mesh into the teeth 4 upon the lifting-bar. Inclosing the said pinion and overlapping the said ears is a guard-cover 13, held in place by the pins 14, which pass through the lugs 15 15. The pinion 12 is mounted upon a shaft 16, which is rectangular in cross-section except at 17 17, where it is round to form a bearing portion. Collar 18 prevents endwise movement of the said shaft within the ears 11. A crank-arm 19, having a handle 20 attached thereto, is designed to be removably secured to either end of the shaft 16, whereby the same is rotated and the lifting-bar elevated. After the lifting-bar has been raised to its proper position a pin 21 is inserted in one of the holes 5 in the lifting-bar overhanging the side of the frame 1, and thereby sustaining the weight of the lifting-bar and the body resting upon the top thereof.

Both of the said lifting-jacks are constructed in substantially the manner above described, and to provide for compactly securing them together when not in use a recess is cut in the base of one of the said jacks, so as to admit the frame of the other jack, as shown in Fig. 5, in which position the base 2 of one jack is in engagement with the lugs 22 upon either side of the frame 1 of the other jack, which thereby prevents its disengagement. The two jacks are locked together by a tie-bar 23, having downwardly-turned portions 24 24 at either end and having engagement with the lugs 25 25 upon the said frames, with the upper portion of said jacks separated by a boss 26, attached to one of the said frames.

It is apparent that by securing the lifting-jacks together, as shown in Fig. 5, they occupy the smallest possible space and can be moved together. To secure one to the other when in use, I have provided a strap 27 27 upon each of the frames, to which a chain or rope can be attached at either end.

Having fully described my invention, what I claim as new, and desire to secure by Letters Patent, is—

1. In a lifting-jack, the combination with the frame 1 having the base 2, and pinion-ears 11 integral therewith; of a vertically-actuated lifting-bar 3 having teeth in one edge and adapted to receive a removable head-piece in its upper end; a pinion 12 the teeth of which mesh into the teeth upon said lifting-bar; a pinion-shaft 16, rectangular in cross-section and having rounded portions 17 17 journaled in the said ears 11 11; a crank-handle 19 adapted to be attached to either end of said pinion-shaft; and a guard-cover 13 removably fixed to the said frame and inclosing the said pinion; all constructed and operating substantially as described.

2. Companion lifting-jacks, one of which is provided with lugs upon either side thereof, and the other with a recess in its base portion of substantially the same width as the vertical frame thereof, whereby the frame of one of said jacks is adapted to enter the said recess, and the base thereof to engage with the said lugs; and a fastening-bar, having engagement at each end with lugs upon the said jacks, substantially as described.

In testimony whereof I affix my signature in presence of two witnesses.

JOSEPH CALLEGARI.

Witnesses:
GEORGE E. HALL,
JOSEPH CALLEGARI, Jr.